2,837,555

PREPARATION OF CARBONATE ESTERS

John M. Lee, Lake Jackson, Tex., assignor to The Dow Chemical Company, Midland, Mich., a corporation of Delaware No Drawing. Application September 20, 1956
Serial No. 610,894

9 Claims. (Cl. 260—463)

This invention relates to a process for the preparation of carbonate esters, and more particularly, to the preparation of carbonate esters by the reaction of phenols with phosgene in the presence of a tetramethyl ammonium halide as a catalyst.

The reactions of phosgene with phenols are known, but without the use of a catalyst these reactions proceed very slowly and produce low yields so that commercial applications of these reactions are not economically feasible. Amphoteric metals have been used as catalysts for these reactions. These metals are good catalysts, but when they are used, it is often difficult to remove traces of these metals from the final product. In many applications of carbonate esters, the presence of even a trace of the metal is deleterious.

It is, therefore, a principal object of this invention to provide a process where high yields of carbonate esters may be obtained by the reaction of phosgene with phenols. A further object is to provide a process where a non-metallic catalyst is used.

The above and other objects may be accomplished by reacting a phenol selected from the group consisting of phenol, cresol, and mixtures thereof with phosgene in the presence of a tetramethyl ammonium halide as a catalyst.

By the process of the present invention symmetrical carbonate esters of phenol and cresol, such as diphenyl carbonate, di-o-cresyl carbonate, di-m-cresyl carbonate, and di-p-cresyl carbonate may be prepared. By reacting phosgene with a mixture of phenol and the respective ortho, meta, and para cresol or the mixtures of the respective cresols, unsymmetrical esters of phenyl cresyl carbonate and of the cresyl carbonates may be obtained. Examples of these carbonates are phenyl o-cresyl carbonate, phenyl m-cresyl carbonate, phenyl p-cresyl carbonate, p-cresyl o-cresyl carbonate, p-cresyl m-cresyl carbonate, and m-cresyl o-cresyl carbonate.

The reaction may be carried out by placing tetramethyl ammonium halide in the phenol or mixtures of the phenols in a liquid phase and contacting this liquid mixture with phosgene. The catalyst is soluble in most of the phenols and carbonate esters so that a batch or continuous process may be conveniently used. In the reaction phosgene reacts with the phenols first to form a chloroformate which further reacts with additional phenol to form the carbonate ester. Stoichiometric amounts of phosgene are only required, although a slight excess may be used.

The catalysts which are effective in catalyzing the reaction are the tetramethyl ammonium halides, such as tetramethyl ammonium chloride, tetramethyl ammonium bromide, and tetramethyl ammonium iodide. The tetramethyl ammonium chloride is the most stable at high temperatures and is thus preferred. While a small amount of catalyst is effective, the rate of reaction may be increased by using a larger amount of catalyst. Generally from 0.5 to 10 weight percent of the catalyst, based upon the phenol charged, is employed, preferably from 5 to 7 weight percent. No apparent benefit is realized by increasing the catalyst content above 10 weight percent.

In the reaction, the reaction mixture must be maintained in a liquid phase in order to obtain a good contact with phosgene. Inert solvents, such as carbon tetrachloride, carbon bisulfide, chlorobenzene, and nitrobenzene may be used, but generally a reaction temperature in the range of 150° to 250° C. is employed which is sufficient to maintain the mixture in the liquid phase without the use of a solvent. At temperatures of 150° C. and above, relatively rapid rate of reaction is obtained and the reaction is substantially completed in a reaction time of ½ to 6 hours. The maximum reaction temperature that may be used is limited by the stability of the catalyst. Tetramethyl ammonium halides will decompose at high temperatures and thus the reaction must be carried out below these decomposition temperatures. With tetramethyl ammonium chloride a reaction temperature up to 410° C. may be safely used.

The carbonated esters obtained may be recovered from the reaction mixture by the various techniques which are apparent to those skilled in the art. Generally a relatively pure product may be obtained by distillation. The product, such as diphenyl carbonate, may also be recovered by washing with water, since the ester is insoluble in water, while the other constituents of the reaction product are soluble.

The following examples further illustrate the invention.

*Example I*

To a 250 ml. flask was added 68.3 grams of phenol and 4.6 grams of tetramethyl ammonium iodide. The reaction flask was constructed to permit the passing of phosgene into the mixture below the surface of the reacting liquid. The flask was operated under total reflux with a water condenser and phosgene was passed into the reaction mixture at a rate of 0.5 grams per minute for about 3¾ hours. The temperature of the reaction mixture increased from 179° at the beginning to 205° C. as the diphenyl carbonate was formed.

The reaction mixture was analyzed and found to contain 92.0 percent diphenyl carbonate, 6.0 percent of chloroformic phenyl ester, and 2 percent phenol.

*Example II*

To the reaction flask of Example I was added 64.3 gm. of phenol and 2.6 gm. of tetramethyl ammonium chloride. The mixture was refluxed and phosgene was passed into the mixture at a rate of 0.46 gm. per minute until about twice the stoichiometric amount of phosgene was added. After the addition of the phosgene which required about 2.4 hours, the reaction mixture was further refluxed for about one hour. The final temperature was 215° C. The molten reaction product was poured into 500 ml. of boiling water, stirred for about 15 minutes, cooled, and filtered. The diphenyl carbonate obtained was again washed with boiling water and dried.

The diphenyl carbonate recovered was 58.8 gm. which represented an 80.4 percent yield.

What is claimed is:

1. A process for the preparation of a carbonate ester, which comprises reacting in a liquid phase a phenol selected from the group consisting of phenol, cresol, and mixtures thereof with phosgene in the presence of a tetramethyl ammonium halide of a halogen having an atomic number in the range of 17 to 54.

2. A process for the preparation of a carbonate ester, which comprises intermixing in a liquid phase a phenol selected from the group consisting of phenol, cresol, and mixtures thereof with from 0.5 to 10 weight percent of a tetramethyl ammonium halide other than a fluoride, and contacting the mixture with phosgene.

3. A process for the preparation of a carbonate ester, which comprises intermixing a phenol selected from the group consisting of phenol, cresol, and mixtures thereof with from 5 to 7 weight percent of a tetramethyl ammonium halide other than a fluoride, and reacting the phenol with phosgene at a temperature in the range of 150° to 250° C.

4. A process for the preparation of diphenyl carbonate, which comprises intermixing liquid phenol with from 0.5 to 10 weight percent of tetramethyl ammonium halide of a halogen having an atomic number in the range of 17 to 54, and contacting the mixture with phosgene.

5. A process for the preparation of diphenyl carbonate, which comprises intermixing phenol with from 5 to 7 weight percent of a tetramethyl ammonium chloride, reacting the phenol with phosgene at a temperature in the range of 150° to 250° C., and recovering the diphenyl carbonate.

6. A process for the preparation of cresyl carbonate ester, which comprises intermixing cresol in a liquid phase with from 0.5 to 10 weight percent of a tetramethyl ammonium halide of a halogen having an atomic number in the range of 17 to 54, and contacting the mixture with phosgene.

7. A process for the preparation of a cresyl carbonate ester, which comprises intermixing cresol with from 5 to 7 weight percent of a tetramethyl ammonium chloride, reacting the cresol with the phosgene at a temperature in the range of 150° to 250° C., and recovering the carbonate ester.

8. A process for the preparation of phenyl cresyl carbonate, which comprises intermixing from 0.5 to 10 weight percent of a tetramethyl ammonium halide of a halogen having an atomic number in the range of 17 to 54 with a mixture of phenol and cresol in the liquid phase, and contacting the mixture with phosgene.

9. A process for the preparation of phenyl cresyl carbonate, which comprises intermixing from 5 to 7 weight percent of a tetramethyl ammonium chloride with a mixture of phenol and cresol, and reacting the mixture with phosgene at a temperature in the range of 150° to 250° C.

References Cited in the file of this patent

UNITED STATES PATENTS

| | | |
|---|---|---|
| 2,362,865 | Tryon et al. | Nov. 14, 1944 |
| 2,387,932 | Muskat et al. | Oct. 30, 1945 |
| 2,648,678 | Heiberger | Aug. 11, 1953 |

OTHER REFERENCES

Marvel et al., Jour. Am. Chem. Soc., vol. 64, 1229–30 (1942).

Bradbury et al., Chem. Abst., vol. 42, col. 1287 (1948).